United States Patent
Scott et al.

(10) Patent No.: US 9,641,333 B2
(45) Date of Patent: *May 2, 2017

(54) AUTHENTICATION METHODS, SYSTEMS, DEVICES, SERVERS AND COMPUTER PROGRAM PRODUCTS, USING A PAIRING-BASED CRYPTOGRAPHIC APPROACH

(71) Applicant: MIRACL LTD., London (GB)

(72) Inventors: Michael Scott, London (GB); Brian Spector, London (GB)

(73) Assignee: MIRACL LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,264

(22) Filed: Jul. 28, 2016

(65) Prior Publication Data

US 2016/0359630 A1    Dec. 8, 2016

Related U.S. Application Data

(63) Continuation of application No. PCT/GB2016/051623, filed on Jun. 2, 2016.

(30) Foreign Application Priority Data

Jun. 2, 2015    (GB) .................................. 1509499.8

(51) Int. Cl.
- *H04L 9/30* (2006.01)
- *H04L 29/06* (2006.01)
- *H04L 9/32* (2006.01)
- *H04L 9/08* (2006.01)

(52) U.S. Cl.
CPC .......... *H04L 9/3073* (2013.01); *H04L 9/0822* (2013.01); *H04L 9/0844* (2013.01);
(Continued)

(58) Field of Classification Search
CPC ..... H04L 9/32; H04L 2209/56; H04L 9/0847; H04L 9/3073
See application file for complete search history.

(56) References Cited

U.S. PATENT DOCUMENTS

| | | | |
|---|---|---|---|
| 2003/0081785 A1* | 5/2003 | Boneh ................... | H04L 9/0847 380/277 |
| 2008/0016346 A1* | 1/2008 | Harrison ............... | H04L 9/3073 713/168 |

(Continued)

OTHER PUBLICATIONS

Holbl et al., Two proposed identity-based three-party authenticated key agreement protocols from pairings, Aug. 3, 2009, Elsevier, 9 Pages.*

(Continued)

*Primary Examiner* — Farid Homayounmehr
*Assistant Examiner* — Christopher C Harris
(74) *Attorney, Agent, or Firm* — Saul Ewing LLP

(57) ABSTRACT

There is disclosed a method of authenticating a client computing device to a server, the client computing device and the server both parties to a common authentication approach, the client computing device including an encrypted identifier containing a secret, in which the client computing device cannot decrypt the encrypted identifier, in which the client computing device encrypts the encrypted identifier using the common authentication approach and sends the encrypted encrypted identifier to the server, and in which the server decrypts the encrypted encrypted identifier, using the common authentication approach and a server secret, so as to determine the secret. Related systems, servers, client computing devices, pairs of computer program products comprising a server program product and a client computing device program product, the server program product, or the client computing program product, are disclosed.

28 Claims, 4 Drawing Sheets

| Client | Server |
|---|---|
| Generates random $x < q$ | |
| $A = H_1(ID)$ | |
| $U = xA$ | |
| $y = H(U\|T)$ | |
| $V = -(x+y)(s-e)A$ | |
| $ID, U, T, V \rightarrow$ | |
| | if $T$ is not current reject the connection |
| | $A = H_1(ID)$ |
| | $y = H(U\|T)$ |
| | $g = e(V,Q) \cdot e(U+yA, sQ)$ |
| | $g = e(U,Q)^e$, solve for $e$ |

(52) U.S. Cl.
CPC .......... *H04L 9/3221* (2013.01); *H04L 9/3231* (2013.01); *H04L 9/3242* (2013.01); *H04L 63/0478* (2013.01); *H04L 63/062* (2013.01); *H04L 63/083* (2013.01); *H04L 63/0861* (2013.01); *G06F 2221/2151* (2013.01); *H04L 9/0847* (2013.01); *H04L 9/32* (2013.01); *H04L 2209/08* (2013.01); *H04L 2209/56* (2013.01); *H04L 2209/80* (2013.01); *H04L 2463/062* (2013.01)

(56) References Cited

U.S. PATENT DOCUMENTS

2008/0177636 A1* 7/2008 Yoshida ............... G06Q 10/107 705/26.35
2009/0208005 A1* 8/2009 Kusakawa ............ H04L 9/3073 380/46

OTHER PUBLICATIONS

Lauter, The Advantages of Elliptic Curve Cryptography for Wireless Security, Dec. 2004, IEEE, 6 Pages.*

Boneh et al, Identity-Based Encryption from the Weil Pairing, Dec. 2001, Springer-Verlag Berlin Heidelberg, 17 pages.*
Goriparthi et al, An improved bilinear pairing based remote user authentication scheme, Dec. 2007, Elsevier, 5 Pages.*
Juang, Efficient password authenticated key agreement using bilinear pairings, Dec. 2007, Elsevier, 8 Pages.*
Das et al. A novel remote user authentication scheme using bilinear pairings, Dec. 2005, Elsevier, 6 Pages.*
Barreto, et al., "Pairing-friendly elliptic curves of prime order", Selected Areas in Cryptology—SAC 2005, vol. 3897 of Lecture Notes in Computer Science, pp. 319-331. Springer-Verlag, 2006.
Bellare, et al., "Security proofs for identity-based identification and signature schemes", Eurocrypt 2004, vol. 3027 of Lecture Notes in Computer Science, pp. 268-286. Springer-Verlag, 2004.
Galbraith, et al., "Pairings for cryptographers", Discrete Applied Mathematics, 156:3113-3121, 2008.
Pollard, "Monte Carlo methods for index computation mod p", Mathematics of Computation, 32, No. 43, pp. 918-924, 1978.
Scott, "Authenticated ID-based key exchange and remote log-in with simple token and PIN number", Cryptology ePrint Archive, Report 2002/164, 2002. http://eprint.iacr.org/2002/164, 2002.
Simmons, "The subliminal channel and digital signatures", Eurocrypt 1984, pp. 364-378. Springer-Verlag, 1985, Nov. 14, 2016.

* cited by examiner

| Client | Server |
|---|---|
| Generates random $x < q$<br>$A = H_1(ID)$<br>$U = xA$<br>$y = H(U|T)$<br>$V = -(x+y)(s-e)A$<br>$ID, U, T, V \rightarrow$ | if $T$ is not current reject the connection<br>$A = H_1(ID)$<br>$y = H(U|T)$<br>$g = e(V,Q) \cdot e(U + yA, sQ)$<br>$g = e(U,Q)^e$, solve for $e$ |

FIGURE 3

AUTHENTICATION METHODS, SYSTEMS, DEVICES, SERVERS AND COMPUTER PROGRAM PRODUCTS, USING A PAIRING-BASED CRYPTOGRAPHIC APPROACH

CROSS-REFERENCE TO RELATED APPLICATIONS

This application is a continuation of International Application No. PCT/GB2016/051623, filed Jun. 2, 2016, which claims priority to GB Application No. 1509499.8, filed Jun. 2, 2015, the entire contents of which is fully incorporated herein by reference.

BACKGROUND OF THE INVENTION

1. Field of the Invention

The field of the invention relates to computer-implemented authentication methods, systems, devices, servers and computer program products.

2. Technical Background

It is common for a server to authenticate itself to a client using standard methods of Public Key cryptography. The Public Key Infrastructure (PKI) supports the Secure Socket Layer (SSL) protocol which in turn enables this functionality. The single point-of-failure in PKI, and hence the focus of attacks, is the Certification Authority. However this entity is commonly off-line, well defended, and not easily got at. For a client to authenticate itself to the server is much more problematical. The simplest and most common mechanism is Username/Password. Although not at all satisfactory, the only onus on the client is to generate and remember a password—and the reality is that we cannot expect a client to be sufficiently sophisticated or well organised to protect larger secrets. However Username/Password as a mechanism is breaking down. So-called zero-day attacks on servers commonly recover files containing information related to passwords, and unless the passwords are of sufficiently high entropy they will be found. The commonly applied patch is to insist that clients adopt long, complex, hard-to-remember passwords. This is essentially a second line of defense imposed on the client to protect them in the (increasingly likely) event that the authentication server will be successfully hacked. Note that in an ideal world a client should be able to use a low entropy password, as a server can limit the number of attempts the client can make to authenticate itself.

A proposed alternative is the adoption of multifactor authentication. In the simplest case the client must demonstrate possession of both a token and a password. The banks have been to the forefront of adopting such methods, but the token is invariably a physical device of some kind.

This patent specification describes not only various ideas and functions, but also their creative expression. A portion of the disclosure of this patent document therefore contains material to which a claim for copyright is made and notice is hereby given:
©Miracl Limited (pursuant to 17 U.S.C. 401). A claim to copyright protection is made to all protectable expression associated with the examples of the invention illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

3. Discussion of Related Art

U.S. Pat. No. 8,971,540B2 discloses a method in a first entity for authenticating itself to a second entity by proving to the second entity that it is in possession of a full secret without sending the full secret to the second entity, the method comprising: receiving in the first entity an input from a user, the full secret having been divided into at least a first factor and a second factor and the input relating to the second factor of the full secret; reconstructing in the first entity the full secret from at least the first factor and the input; and carrying out a calculation in the first entity using the reconstructed full secret and sending the results of the calculation to the second entity, wherein the results provide an input to a pairing calculation in the second entity.

SUMMARY OF THE INVENTION

According to a first aspect of the invention, there is provided a method of authenticating a client computing device to a server, the authentication approach using a pairing based cryptographic approach, using type-3 pairing defined by a mapping e: $G1 \times G2 \rightarrow GT$, in which G1, G2 and GT are all cyclic groups of the same prime order q and in which the groups G1 and G2 are distinct, and in which Q is a fixed point in G2, the method including the steps of:

(i) the client computing device receiving an encrypted identifier $(s-\epsilon)A$ from a trusted authority, the trusted authority having used its master key s and a secret $\epsilon$ to encrypt the identifier $(s-\epsilon)A$ associated with the client computing device, where $A=H1(ID)$, where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random $x<q$, and calculating $A=H1(ID)$ and $U=xA$;

(iv) the client computing device calculating $y=H(U|T)$, where H is a hash function which hashes its input to an element in Fq, and T is a time stamp;

(v) the client computing device calculating $V=-(x+y)(s-\epsilon)A$;

(vi) the client computing device sending ID, U, T and V to the server in an authentication request;

(vii) the server rejecting the authentication request if T is not current;

(viii) the server calculating $A=H1(ID)$ and $y=H(U|T)$;

(ix) the server calculating $g=e(V,Q)\cdot e(U+yA,sQ)=e(U,Q)^{\wedge}(\epsilon)$, and solving for $\epsilon$;

(x) the server recording that the client computing device with the identifier ID has supplied the secret $\epsilon$ in an encrypted form.

Advantages are that the client computing device is unable to decrypt the identifier $(s-\epsilon)A$, which keeps the secret $\epsilon$ secure, the server does not receive the encrypted identifier $(s-\epsilon)A$, which means that the server cannot be used to attempt to use the identifier $(s-\epsilon)A$ for fraudulent identification purposes, and yet in spite of this, the server is able to decrypt and solve for the secret $\epsilon$, for use in authentication processes. Hence an advantage is a very secure authentication method.

The method may be one including the step of: the trusted authority using its master key s and the secret $\epsilon$ to encrypt the identifier $(s-\epsilon)A$, and sending the encrypted identifier $(s-\epsilon)A$ to the client computing device. An advantage is further security provided through use of a trusted authority.

The method may be one including the step of: the trusted authority using its master key s to calculate the secret sQ, and sending sQ to the server. An advantage is further security provided through use of a trusted authority.

The method may be one wherein the secret $\epsilon$ is a short secret.

The method may be one wherein the short secret $\epsilon$ is a credit card number.

The method may be one wherein the credit card number consists of 5 blocks of 4 decimal digits each.

The method may be one in which a financial transaction is authenticated.

The method may be one in which the server decrypts the secret $\epsilon$ without the server knowing (s-$\epsilon$)A.

The method may be one in which the server decrypts the secret $\epsilon$ without the client computing device knowing the secret $\epsilon$.

The method may be one in which the client computing device has no way of decrypting (s-$\epsilon$)A to obtain the secret $\epsilon$.

The method may be one in which the pairing-based cryptographic approach uses an elliptic curve.

The method may be one in which the elliptic curve is a Barreto-Naehrig (BN) elliptic curve.

The method may be one in which the elliptic curve uses the Advanced Encryption Standard (AES)-128 level of security. An advantage is security.

The method may be one in which the elliptic curve uses the Advanced Encryption Standard (AES)-192 level of security. An advantage is security.

The method may be one in which the elliptic curve uses the Advanced Encryption Standard (AES)-256 level of security. An advantage is security.

The method may be one in which the pairing-based cryptographic approach makes standard pairing-based security assumptions, including the external Diffie-Hellman (XDH) assumption that the decisional Diffie-Hellman problem is hard in G1.

The method may be one in which the server is authenticated to the client computing device.

The method may be one in which the server is authenticated to the client computing device in a standard way.

The method may be one in which the server is authenticated to the client computing device in a standard way, using the well known Secure Sockets Layer (SSL) protocol.

The method may be one in which the method attempts to prove in zero knowledge to the server that the owner of the claimed identity ID is in possession of the value (s-$\epsilon$)A issued to it by the trusted authority.

The method may be one in which the server performs a calculation of a pairing and a solution of a discrete logarithm problem in GT, to find E.

The method may be one in which the server performs a calculation of a pairing and a solution of a discrete logarithm problem in GT, using the method of Pollard's Kangaroos, to find $\epsilon$.

The method may be one in which the client computing device receives the encrypted identifier (s-$\epsilon$)A from the trusted authority in a plurality of blocks.

The method may be one in which a protocol of the method is performed for each block.

The method may be one in which the encrypted identifier (s-$\epsilon$)A includes an authentication factor. An advantage is further security.

The method may be one in which the method includes the step of receiving an authentication factor from a user.

The method may be one including the step of the authentication factor being re-inserted in the encrypted identifier (s-$\epsilon$)A. An advantage is further security.

The method may be one in which the authentication factor is a PIN.

The method may be one in which the authentication factor is a string of data.

The method may be one in which the string of data represents a password or a soft biometric.

The method may be one in which if the authentication factor is incorrect, a valid secret $\epsilon$ will not be decrypted by the server. An advantage is further security.

The method may be one in which the trusted authority is distributed. An advantage is further security.

The method may be one in which the trusted authority is distributed in that the client computing device can retrieve s1H1(ID) from a first trusted authority, s2H1(ID) from a second trusted authority, and then add s1H1(ID) and s2H1(ID) together to create sH1(ID), where s=s1+s2. An advantage is further security.

The method may be one in which an adjusted secret is created by subtracting 6, or the $\epsilon i$, from just one of the trusted authority master secret shares. An advantage is further security.

The method may be one in which the equivalent server secrets s1Q and s2Q are applied separately as e(X, sQ)=e(X, s1Q)·e(X, s2Q). An advantage is further security.

The method may be one in which the client computing device is a mobile phone.

The method may be one in which the ID which is an identifier of the client computing device is a pseudonym in a predetermined format to preserve anonymity.

The method may be one in which the server is a merchant's server.

According to a second aspect of the invention, there is provided a system comprising a client computing device and a server, the system configured to perform an authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, in which:

(i) the client computing device is arranged to receive an encrypted identifier (s-$\epsilon$)A from a trusted authority, the trusted authority having used its master key s and a secret $\epsilon$ to encrypt the identifier (s-$\epsilon$)A associated with the client computing device, where A=H1(ID), where H1 is a hash function which hashes its input to a point on G1, and ID is an identifier of the client computing device;

(ii) the server is arranged to receive from the trusted authority a secret sQ encrypted by the trusted authority using the master key s;

(iii) the client computing device is configured to generate a random x<q, and to calculate A=H1(ID) and U=xA;

(iv) the client computing device is configured to calculate y=H(U|T), where H is a hash function which hashes its input to an element in Fq, and T is a time stamp;

(v) the client computing device is configured to calculate V=−(x+y)(s-$\epsilon$)A;

(vi) the client computing device is configured to send ID, U, T and V to the server in an authentication request;

(vii) the server is configured to reject the authentication request if T is not current;

(viii) the server is configured to calculate A=H1(ID) and y=H(U|T);

(ix) the server is configured to calculate g=e(V,Q)·e(U+yA,sQ)=e(U,Q)^($\epsilon$), and to solve for $\epsilon$;

(x) the server is configured to record that the client computing device with the identifier ID has supplied the secret $\epsilon$ in an encrypted form.

The system may further include the trusted authority.

The system may be configured to perform a method of any aspect according to a first aspect of the invention.

According to a third aspect of the invention, there is provided the client computing device of any aspect of the second aspect of the invention.

According to a fourth aspect of the invention, there is provided the server of any aspect of the second aspect of the invention.

According to a fifth aspect of the invention, there is provided a pair of computer program products, including a client computing device computer program product and a server computer program product, the client computing device computer program product executable on a client computer device, and the server computer program product executable on a server, to perform a method of authenticating the client computing device to the server, the authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, the method including the steps of:

(i) the client computing device receiving an encrypted identifier (s-$\epsilon$)A from a trusted authority, the trusted authority having used its master key s and a secret $\epsilon$ to encrypt the identifier (s-$\epsilon$)A associated with the client computing device, where A=H1(ID), where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random x<q, and calculating A=H1(ID) and U=xA;

(iv) the client computing device calculating y=H(U|T), where H is a hash function which hashes its input to an element in Fq, and T is a time stamp;

(v) the client computing device calculating V=−(x+y)(s-$\epsilon$)A;

(vi) the client computing device sending ID, U, T and V to the server in an authentication request;

(vii) the server rejecting the authentication request if T is not current;

(viii) the server calculating A=H1(ID) and y=H(U|T);

(ix) the server calculating g=e(V,Q)·e(U+yA,sQ)=e(U,Q)^($\epsilon$), and solving for $\epsilon$;

(x) the server recording that the client computing device with the identifier ID has supplied the secret $\epsilon$ in an encrypted form.

The pair of computer program products may be a pair in which the client computing device computer program product is executable on the client computer device, and the server computer program product is executable on the server, to perform a method of any aspect of the first aspect of the invention.

According to a sixth aspect of the invention, there is provided the client computing device computer program product of any aspect of the fifth aspect of the invention.

According to a seventh aspect of the invention, there is provided the server computer program product of any aspect of the fifth aspect of the invention.

According to an eighth aspect of the invention, there is provided a method of authenticating a client computing device to a server, the authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, the method including the steps of:

(i) the client computing device receiving an encrypted identifier (s-$\epsilon$-PIN)A from a trusted authority, the trusted authority having used its master key s, a PIN number and a secret $\epsilon$ to encrypt the identifier (s-$\epsilon$-PIN)A associated with the client computing device, where A=H1(ID), where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random x<q, and calculating A=H1(ID) and U=xA;

(iv) the client computing device calculating y=H(U|T), where H is a hash function which hashes its input to an element in Fq, and T is a time stamp;

(v) the client computing device receiving an input of a personal identification number, and the client computing device calculating a value for (s-$\epsilon$)A using the personal identification number;

(vi) the client computing device calculating V=−(x+y)(s-$\epsilon$)A;

(vii) the client computing device sending ID, U, T and V to the server in an authentication request;

(viii) the server rejecting the authentication request if T is not current;

(ix) the server calculating A=H1(ID) and y=H(U|T);

(x) the server calculating g=e(V,Q)·e(U+yA,sQ)=e(U,Q)^($\epsilon$), and solving for $\epsilon$;

(xi) the server recording that the client computing device with the identifier ID has supplied the secret $\epsilon$ in an encrypted form.

The method may be one including a method of any aspect of the first aspect of the invention.

According to a ninth aspect of the invention, there is provided a system comprising a client computing device and a server, the system configured to perform an authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, in which:

(i) the client computing device is arranged to receive an encrypted identifier (s-$\epsilon$-PIN)A from a trusted authority, the trusted authority having used its master key s, a PIN number, and a secret $\epsilon$ to encrypt the identifier (s-$\epsilon$-PIN)A associated with the client computing device, where A=H1(ID), where H1 is a hash function which hashes its input to a point on G1, and ID is an identifier of the client computing device;

(ii) the server is arranged to receive from the trusted authority a secret sQ encrypted by the trusted authority using the master key s;

(iii) the client computing device is configured to generate a random x<q, and to calculate A=H1(ID) and U=xA;

(iv) the client computing device is configured to calculate y=H(U|T), where H is a hash function which hashes its input to an element in Fq, and T is a time stamp;

(v) the client computing device configured to receive an input of a personal identification number, and to calculate a value for (s-$\epsilon$)A using the personal identification number;

(vi) the client computing device is configured to calculate V=−(x+y)(s-$\epsilon$)A;

(vii) the client computing device is configured to send ID, U, T and V to the server in an authentication request;

(viii) the server is configured to reject the authentication request if T is not current;

(ix) the server is configured to calculate A=H1(ID) and y=H(U|T);

(x) the server is configured to calculate g=e(V,Q)·e(U+yA,sQ)=e(U,Q)^($\epsilon$), and to solve for $\epsilon$;

(xi) the server is configured to record that the client computing device with the identifier ID has supplied the secret $\epsilon$ in an encrypted form.

The system may further include the trusted authority.

The system may be one configured to perform a method of any of aspect of the eighth aspect of the invention.

According to a tenth aspect of the invention, there is provided the client computing device of any aspect of the ninth aspect of the invention.

According to an eleventh aspect of the invention, there is provided the server of any aspect of the ninth aspect of the invention.

According to an twelfth aspect of the invention, there is provided a pair of computer program products, including a client computing device computer program product and a server computer program product, the client computing device computer program product executable on a client computer device, and the server computer program product executable on a server, to perform a method of authenticating the client computing device to the server, the authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, the method including the steps of:

(i) the client computing device receiving an encrypted identifier (s-$\epsilon$-PIN)A from a trusted authority, the trusted authority having used its master key s, a PIN number and a secret $\epsilon$ to encrypt the identifier (s-$\epsilon$-PIN)A associated with the client computing device, where A=H1(ID), where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random x<q, and calculating A=H1 (ID) and U=xA;

(iv) the client computing device calculating y=H(U|T), where H is a hash function which hashes its input to an element in Fq, and T is a time stamp;

(v) the client computing device receiving an input of a personal identification number, and the client computing device calculating a value for (s-$\epsilon$)A using the personal identification number;

(vi) the client computing device calculating V=-(x+y)(s-$\epsilon$)A;

(vii) the client computing device sending ID, U, T and V to the server in an authentication request;

(viii) the server rejecting the authentication request if T is not current;

(ix) the server calculating A=H1 (ID) and y=H(U|T);

(x) the server calculating g=e(V,Q)·e(U+yA,sQ)=e(U,Q) ^($\epsilon$), and solving for $\epsilon$;

(xi) the server recording that the client computing device with the identifier ID has supplied the secret $\epsilon$ in an encrypted form.

The pair of computer program products of the twelfth aspect of the invention, the client computing device computer program product executable on the client computer device, and the server computer program product executable on the server, may be configured to perform a method of any aspect of the eighth aspect of the invention.

According to a thirteenth aspect of the invention, there is provided the client computing device computer program product of any aspect of the twelfth aspect of the invention.

According to a fourteenth aspect of the invention, there is provided the server computer program product of any aspect of the twelfth aspect of the invention.

According to a fifteenth aspect of the invention, there is provided a method of authenticating a client computing device to a server, the authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, the method including the steps of:

(i) the client computing device receiving an encrypted identifier (s-$\epsilon$)A from a trusted authority, the trusted authority having used its master key s and a secret $\epsilon$ to encrypt the identifier (s-$\epsilon$)A associated with the client computing device, where A=H1(ID), where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random x<q, and calculating A=H1(ID) and U=xA;

(iv) the client computing device calculating V=-x(s-$\epsilon$)A;

(v) the client computing device sending ID, U and V to the server in an authentication request;

(vi) the server calculating g=e(V,Q)·e(U,sQ)=e(U,Q)^($\epsilon$), and solving for $\epsilon$;

(vii) the server recording that the client computing device with the identifier ID has supplied the secret $\epsilon$ in an encrypted form.

The method may be one further including a method of any aspect according to a first aspect of the invention.

There are further provided a system, server, client computing device, pair of computer program products comprising a server program product and a client computing device program product, the server program product, or the client computing program product, of any aspect according to the fifteenth aspect of the invention.

According to a sixteenth aspect of the invention, there is provided a method of authenticating a client computing device to a server, the authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, the method including the steps of:

(i) the client computing device receiving an encrypted identifier sA from a trusted authority, the trusted authority having used its master key s to encrypt the identifier sA associated with the client computing device, where A=H1 (ID), where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random x<q, and calculating A=H1(ID) and U=xA;

(iv) the client computing device calculating V=-xsA;

(v) the client computing device sending ID, U and V to the server in an authentication request;

(vi) the server calculating g=e(V,Q)·e(U,sQ);

(vii) the server rejecting the authentication request if g≠1.

The method may be one further including a method of any aspect according to a first aspect of the invention.

There are further provided a system, server, client computing device, pair of computer program products comprising a server program product and a client computing device program product, the server program product, or the client computing program product, of any aspect according to the sixteenth aspect of the invention.

According to a seventeenth aspect of the invention, there is provided a method of authenticating a client computing device to a server, the authentication approach using a pairing based cryptographic approach, using type-3 pairing defined by a mapping, the method including the steps of:

(i) the client computing device receiving an encrypted identifier from a trusted authority, the trusted authority having used its master key and a secret to encrypt the identifier associated with the client computing device;

(ii) the server receiving from the trusted authority a server secret encrypted by the trusted authority using the master key;

(iii) the client computing device generating a random number, and using the random number to encrypt a representation of a mapping of the ID;

(iv) the client computing device using the result of step (iii) to encrypt a representation of the time T;

(v) the client device using the result of step (iv), the random number and the encrypted identifier to encrypt a representation of the result of step (iv), the random number and the encrypted identifier;

(vi) the client computing device sending the client computing device ID, the result of step (iii), T and the result of step (v) to the server in an authentication request;

(vii) the server rejecting the authentication request if T is not current;

(viii) the server calculating the value of step (iv), and the mapping of step (iii);

(ix) the server calculating a value using a predetermined function which relates to the type-3 pairing, which takes the result of step (v), a predetermined point in the type-3 pairing, the result of step (iii), the mapping of step (iii), the result of step (iv), and the server secret, and then solving for the secret;

(x) the server recording that the client computing device with the identifier ID has supplied the secret in an encrypted form.

The method may be one further including a method of any aspect according to a first aspect of the invention.

There are further provided a system, server, client computing device, pair of computer program products comprising a server program product and a client computing device program product, the server program product, or the client computing program product, of any aspect according to the seventeenth aspect of the invention.

According to a eighteenth aspect of the invention, there is provided a computer-implemented method of authenticating a client computing device to a server, the client computing device and the server both parties to a common authentication approach, the client computing device including an encrypted identifier containing a secret, in which the client computing device cannot decrypt the encrypted identifier, in which the client computing device encrypts the encrypted identifier using the common authentication approach and sends the encrypted encrypted identifier to the server, and in which the server decrypts the encrypted encrypted identifier, using the common authentication approach and a server secret, so as to determine the secret.

The method may be one further including a method of any aspect according to a first aspect of the invention.

There are further provided a system, server, client computing device, pair of computer program products comprising a server program product and a client computing device program product, the server program product, or the client computing program product, of any aspect according to the eighteenth aspect of the invention.

Aspects of the invention may be combined.

BRIEF DESCRIPTION OF THE FIGURES

Aspects of the invention will now be described, by way of example(s), with reference to the following Figures, in which:

FIG. 3 shows a Table which relates to a final protocol example.

DETAILED DESCRIPTION

Figure 1:
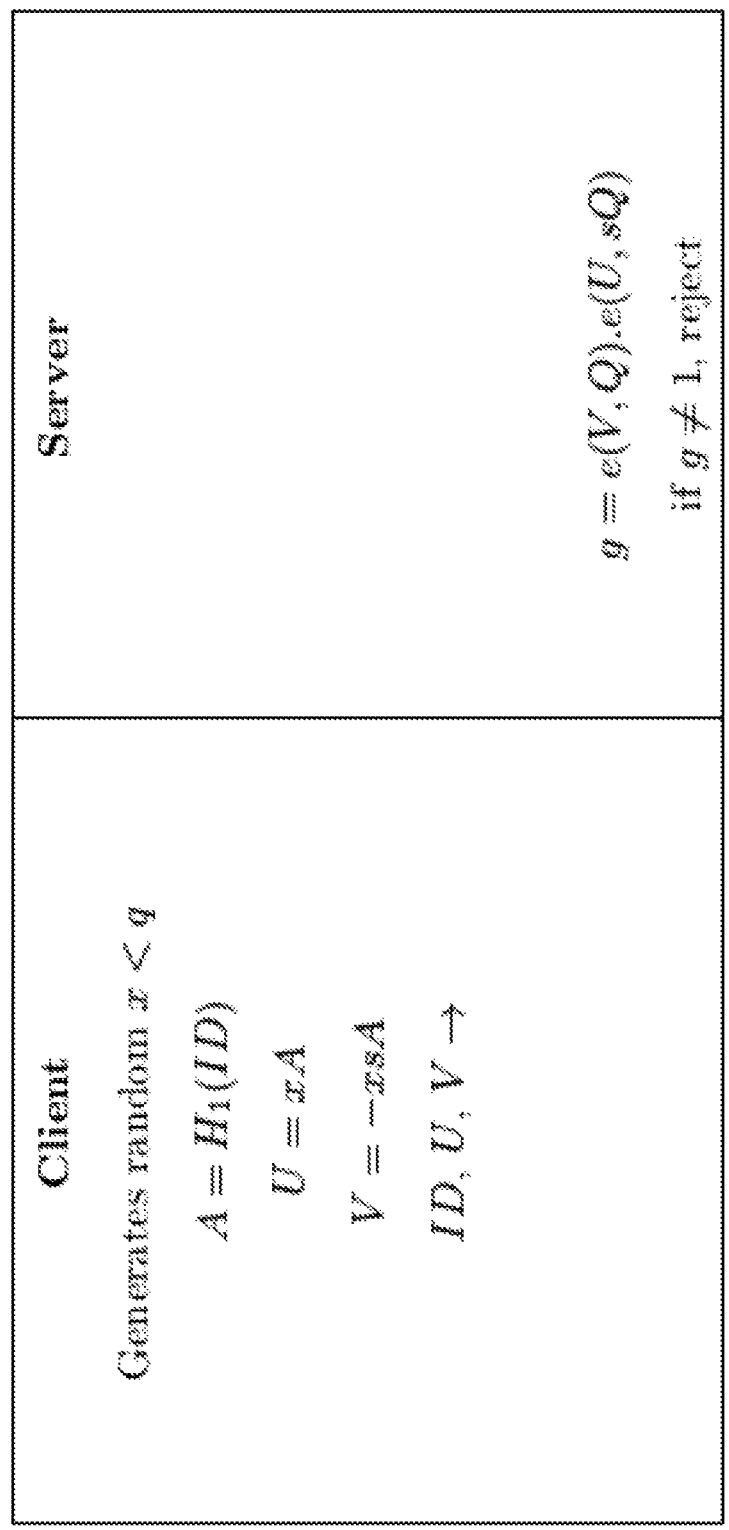
FIG. 1 shows a Table which relates to a simple authentication protocol example.

The Johnny Carson protocol—or how to read the contents of a sealed envelope.

Johnny Carson, as long time host of the 'Tonight' show on US television, often appeared in the spoof role of 'Carnac the Magnificent', a mentalist who could magically read the contents of a sealed envelope. This is in fact a well known stock-in-trade trick of the mentalist's craft, known as "billet reading". Here we propose a cryptographic solution to the problem of billet reading, apparently allowing a ciphertext to be decrypted without direct knowledge of the ciphertext, and present both a compelling use case and a practical implementation.

INTRODUCTION

In an example, a credit card owner, a customer of a credit card company, wants to carry his credit card number (CCN) around on his mobile phone, but stored in an encrypted form (e.g. in case his mobile phone should be stolen). We call this the Cipher-text. However no encryption or decryption keys are available to the owner. So although the owner may know his own credit card details, the owner cannot either encrypt another's details, or indeed decrypt his own Ciphertext.

At some point the owner decides to make a purchase from a merchant. The merchant knows nothing about the owner or their credit card, and has nothing stored related to either. Ideally the credit card owner wants to enter into a protocol with the merchant using the Ciphertext such that (a) the merchant learns nothing about the Ciphertext (e.g. in case a dishonest merchant should use the Ciphertext for their own purchases), but nonetheless (b) the merchant is able to determine the credit card number.

An immediate objection might appear to be that in this scenario a stolen Ciphertext is as good as a CCN, as it can clearly be used to make purchases from the merchant. Later we shall show how, in a practical implementation, the Ciphertext can be adequately protected just using a short Personal identification number (PIN) number. Using a PIN number to protect credit card transactions is a well known and trusted mechanism, and the same familiar PIN can be used here.

Although use of a PIN number is described, it will be appreciated by those skilled in the art that more generally an authentication factor may be used, which is not limited to a PIN number, but may be another string of data, such as one representing a password or a soft biometric, for example.

Clearly a trusted authority (TA) must be involved, probably belonging to the credit card company, as otherwise there is no way to encrypt the CCN. Assume that this TA is known to both the customer and the merchant. The TA has its own master key s. The customer approaches the TA who encrypts the CCN using the encryption key s to create the Ciphertext Es(CCN), which is given to the customer. Note that it is not essential that the customer actually knows their own CCN. The TA also issues to the merchant a value Ds, derived from s, but from which s cannot be extracted.

In this example, the idea now is that the customer should be able to enter into a protocol with the merchant, using Es(CCN), such that the merchant ends up knowing CCN, but in the process learns nothing about Es(CCN). By analogy the customer is able to magically determine CCN without touching the "sealed envelope" that is Es(CCN). The trick is (and there has to be a trick!) is that the mentalist/merchant has in their possession the apparently unrelated secret Ds.

For the purposes of this example in this disclosure, we assume that a credit card number consists of 5 blocks of 4 decimal digits each.

A Simple Authentication Protocol

To realise our solution, we will use pairing-based cryptography. To be concrete, in this example we assume the use of a Barreto-Naehrig (BN) elliptic curve [1] at the Advanced Encryption Standard (AES)-128 level of security. (Alternatively, the AES-192 or AES-256 level of security may be used). This is (and in this example must be) a type-3 pairing [3], where e: $G1 \times G2 \rightarrow GT$. The groups G1, G2 and GT are all cyclic groups of the same prime order q. The groups G1 and G2 are distinct. We make standard pairing-based security assumptions, including the external Diffie-Hellman (XDH) assumption that the decisional Diffie-Hellman problem is hard in G1. The meaning of this assumption would be clear to one skilled in the art.

The decisional Diffie-Hellman (DDH) assumption is a computational hardness assumption about a certain problem involving discrete logarithms in cyclic groups. It may be defined as follows. Consider a cyclic group J of order r with generator h. The DDH assumption states that, given h^a and h^b for uniformly and independently chosen a, b∈Zr, the value h^(ab) looks like a random element in J.

First, in this example, we consider a simple protocol, in which a client tries to authenticate to a server. We assume that the server is authenticated to the client in a standard way, for example using the well known Secure Sockets Layer (SSL) protocol. Here ID is the client identity and H1(•) is a hash function which hashes its input to a point on G1.

This protocol attempts to prove in zero knowledge to the server that the owner of the claimed identity ID is in possession of the value sA issued to it by the TA, where A=H1(ID). The same TA has issued the secret sQ∈G2 to the server, where Q is a fixed public point in G2. Correctness follows immediately from the well known bilinearity property of the pairing. See FIG. 1, for example. In FIG. 1, where it is written that g≠1, we note that '1' is the number 1 which is the identity element in GT.

Figure 2:
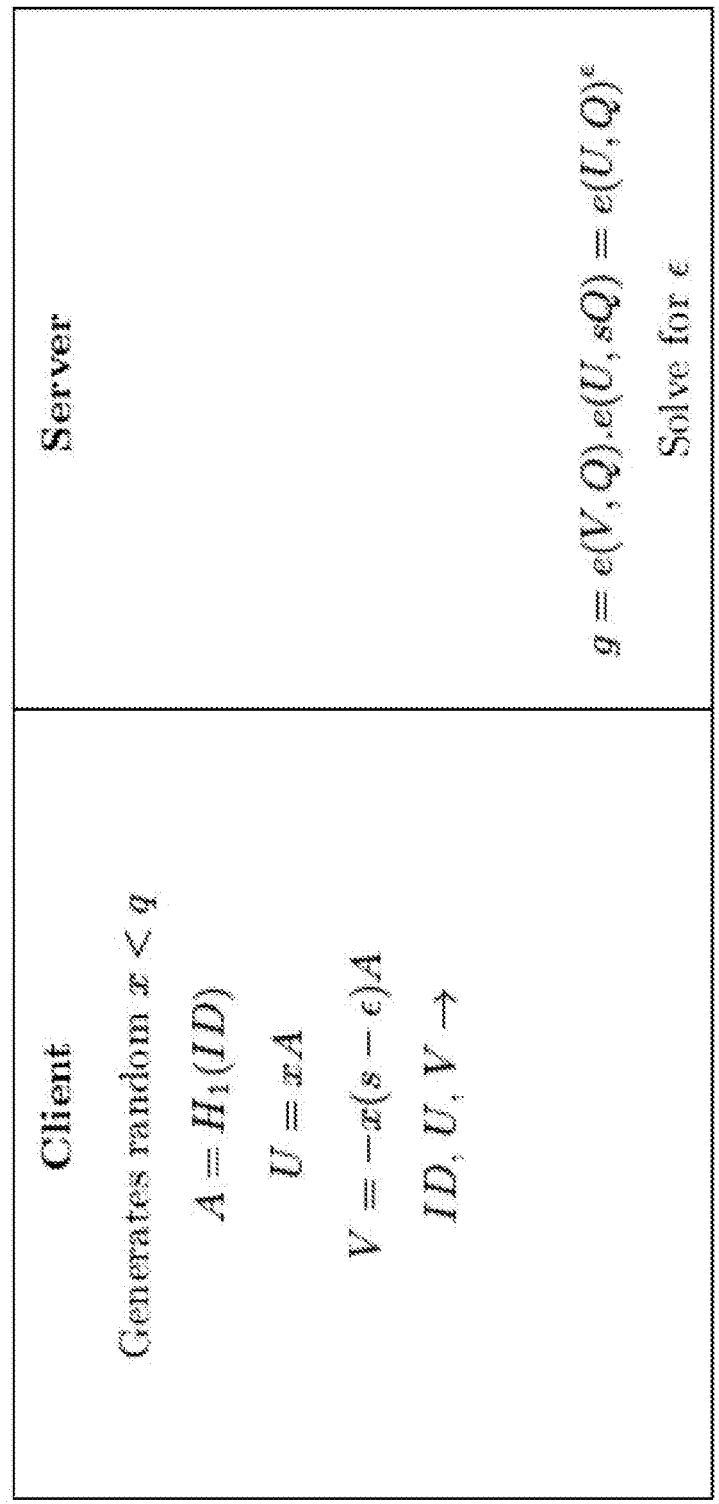
FIG. 2 shows a Table which relates to a subliminal channel example.

As an authentication protocol this has some deficiencies (for example it is subject to a simple replay attack), but for the moment we will ignore them. Next, in an example, we introduce a small error E into the client's secret sA. See FIG. 2, for example.

Observe now that the value of g as calculated on the server side can be used to recover ϵ. Strictly speaking as an authentication protocol we might consider that the authentication has failed. Or we may permit a small deviation ϵ and judge the authentication a success. In either case we claim that the successful transmission of ϵ represents a secure narrow-band subliminal channel [6] whereby a short secret ϵ can be communicated from the client to the server.

For the server to find E requires the calculation of a pairing and the solution of a discrete logarithm problem in GT. The appropriate algorithm is the method of Pollard's Kangaroos [4]. This is a "square root" algorithm, which means that for a 4-digit ϵ usually only a few hundred multiplications in GT will be required to find ϵ, which is completely practical.

To establish the security of the subliminal channel consider a powerful passive observer who has recorded the communication and subsequently somehow captures the un-adjusted client secret sA. Now they are in possession of sA, xA and x(s-ϵ)A. However this does not reveal ϵ, as a consequence of the XDH assumption.

Finally, in an example, we upgrade our protocol to use a non-interactive version of a provably secure zero-knowledge protocol for proof of identity (ref. [2], section 5.3), introducing a time stamp T to prevent replay attacks. See for example FIG. 3, where the hash function H(•) hashes its input to an element in Fq, and the symbol | indicates simple concatenation of the inputs. Fq is the finite field of order q.

A finite field is a field that contains a finite number of elements. As with any field, a finite field is a set on which the operations of multiplication, addition, subtraction and division are defined and satisfy certain basic rules. The most common examples of finite fields are given by the integers mod p when p is a prime number. The number of elements of a finite field is called its order.

Our Use Case Solution

In this example, the way forward is as follows. The TA issues to the customer the secrets (s-ϵn)H1(ID|n) where ϵn is n-th block of 4 digits of the CCN. This is done for each of the five blocks of the CCN, for n=1 to 5. This now constitutes our ciphertext Es(CCN). On the server side Ds=sQ. To communicate the CCN to the merchant's server, we run the above protocol five times. In practice the five client to server communications can all be batched into a single blob of data, sharing the same time-stamp.

DISCUSSION

In the particular use case considered here, the identity used in the protocol is of no particular significance, and may be a pseudonym in a predetermined format to preserve anonymity.

To protect the Ciphertext, an idea borrowed from [5] is to subtract from each component of it a PIN number, so that the secrets are now (s-ϵn-PIN)H1(ID|n). This PIN can then be re-inserted when the protocol is run. Clearly without the correct PIN, a valid CCN will not be received by the server.

If the merchant's secret is stolen then clearly all captured Ciphertexts can be decrypted. However a stolen merchant secret cannot by itself be used to make purchases from honest merchants.

To remove any single point of failure, the TA can be distributed. In an example scenario, the client can retrieve s1H1(ID) from one TA, s2H1(ID) from a second TA, and then add them together to create sH1(ID), where s=s1+s2. In this case the adjusted secret for our use case would be created by subtracting the $\epsilon i$ from just one of the TA master secret shares. Also the equivalent server secrets s1Q and s2Q can be applied separately as e(X, sQ)=e(X, s1Q)·e(X, s2Q) due to the bilinearity property of the pairing.

Trusted Authority Example

The trusted authority (TA) may comprise a computing device e.g. a computer, or a server. The TA may be a separate entity to the client and the server and may act as a controller of the system. The computing device comprises a processor 41, a memory 42 for storing computer program instructions and a storage 43 for storing data. The memory may store an initialisation program 44 that generates the master secret 9 and enrolls participants in the system. It may also allocate identifiers to the entities of the system. The program may also comprise instructions for sending an initialisation program to the client to allow the client to receive the Ciphertext and the PIN. For example, the TA may provide the initialisation program through a web interface to the client. The initialisation program may also include instructions for issuing time permits.

The processor 41 is configured to execute the instructions in memory. The processor also comprises its own internal temporary memory, such as cache memory, for temporarily storing data during execution of the instructions in memory 42.

The storage 43 may comprise secure storage that stores the master secret 9. The secure storage may be tamper proof or tamper resistant. The secure storage may also comprise a list 45 of the clients and servers enrolled in the system. The list of clients and servers 45 may also store time permits for the clients. Additionally, the storage of the trusted authority may store parameters 46 to be used in the protocols, including parameters defining an algebraic curve and hash functions to be used in the protocol. The TA may send this information to the clients and the servers or publish it for the clients and the servers to obtain when needed. The information may be included in the initialisation program provided to the client.

In some examples the TA only comprises the program instructions to be executed by the processor. In other examples, the TA may be a dedicated hardware device.

Figure 4:
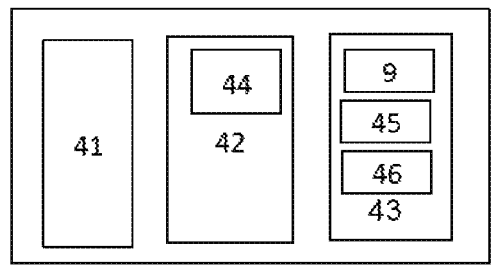
FIG. 4 is a schematic block diagram of a trusted authority example.

An example is shown in FIG. 4.

Client Computing Device Example

The client computing device comprises a computer, a server or other computing device. The client computing device may for example be a personal computer, laptop or a mobile telephone or other personal portable device or mobile device. The client computing device comprises a processor 21, a memory 22 for storing computer program instructions and storage 23 for storing data. The memory 22 may store an initialisation program 24 for allowing the client to create an PIN and store an encrypted secret 10 and an authentication program 25 for allowing the client to authenticate itself to the server using the PIN and the encrypted secret 10. The client may have received, over a secure communication link, the initialisation program 24 from the TA and the authentication program 25 from an authentication server. Alternatively, the client may receive both programs from the TA, the authentication server or from another entity. In some implementations, the initialisation program and the authentication program form part of the same computer program. The initialisation program may store instructions for enrolling in the system. The instructions may include instructions for providing a graphical user interface for the user to enter a PIN, instructions for receiving the PIN from an input device, used by the user to enter the PIN. The input device may for example be a keypad or a keyboard, which forms part of or is connectable to, the client. The authentication program 25 may comprise instructions for reconstructing the client secret from multiple factors, e.g. the PIN and the encrypted secret, and engage in the authentication protocol with the server. The instructions may also enable the client to engage in an authenticated key agreement process with the authentication server. In some examples, the initialisation program 24 may be served through a web interface to the client by the trusted authority. Similarly, in some examples, the authentication program 25 may be served through a web interface to the client from the authentication server. The client may receive the programs through the web interface and store them in the memory 22. In some implementations, when the programs are served through a web interface, the programs, or a part of the programs, may not be stored in the memory 22.

The memory may also store additional instructions for communication with the server and other devices. For example the instructions may provide a browser. The browser may be a web browser for the user to access the World Wide Web but it can also be a browser for accessing resources in a private network. The initialisation program 24 and the authentication program 25 may form part of or be served through, the browser. The client may for example download and store the programs in the client's browser memory. In some examples, the client may be provided by the browser.

The processor 21 is configured to execute the instructions. The processor may have its own internal temporary memory, for example a cache memory, in order to store and quickly access some data during execution of the instructions in the memory 22.

The storage 23 may store the encrypted secret 10. The storage may be provided by the storage of a browser. Alternatively, the storage may comprise a separate universal serial bus (USB) flash drive for storing the encrypted secret 10. The storage may also store the client's identity 26. For example, the client's identity may be stored as metadata with the encrypted secret 10. In other examples, the identity is not stored in the storage of the client but entered by the user each time it is needed. In some examples, where time permits are used, the storage may also store a time permit 27. The storage need not be protected. In typical examples, without the PIN, which is not stored, the encrypted secret cannot be recovered. Consequently, even if an external entity gets hold of the encrypted secret and the client identity, it will not be able to recover the secret.

The initialisation program 24 and the authentication program 25 may be provided by a JavaScript program. The JavaScript program may comprise one or more separate program modules and the initialisation program and the authentication program may be provided by separate modules. The JavaScript program may also be used to receive the PIN from the user. The JavaScript program may store the encrypted secret in the browser's storage or alternative unprotected storage. The client may be provided by this JavaScript program. The program may be configured to run on a general purpose user device. The JavaScript program may be served through a web interface from the authentication server and/or the TA to the device. In some implementations, the program could for example be received or downloaded from the authentication server and/or the TA and installed on the general purpose user device.

Figure 5:
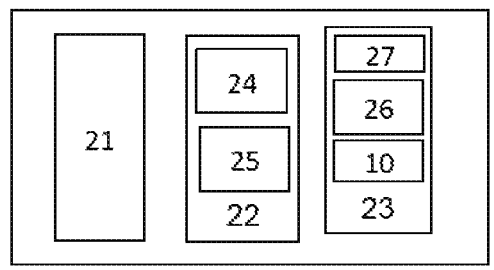
FIG. 5 is a schematic block diagram of a client computing device example.

An example is shown in FIG. 5.

Server Example

An authentication server comprises a computer, a server or other computing device. The computing device comprises a processor 31, a memory 32 for storing computer program instructions and storage 33 for storing data. The memory 32 comprises a server authentication program 34 with instructions in the form of computer code for running the server side of the authentication processes. The authentication program may comprise instructions for enrolling with the TA to obtain its own secret. The program also comprises instructions for authenticating the client. In some implementations, the program may comprise computer instructions for deriving a session key. The program may further comprise instructions for sending the client the client authentication program 25 comprising instructions for the client to carry out its side of the authentication protocol. On receipt, a general purpose user device can use the program to participate in the system and authenticate itself to the server using the secret received from the TA. The client may store and execute the program and the program may configure the client to carry out the authentication process with respect to the server using the secret received from the TA. Moreover, the authentication program 34 may comprise instructions for carrying out an error handling process if the client receives an incorrect PIN from the user and therefore fails an attempt to authenticate to the server. The authentication program 34 may comprise a module for registering with the TA and a separate module for communicating with the client. When the authentication program 34 also includes instructions for carrying out an error handling process, the authentication program may comprise a separate error handling module. The server may have obtained the authentication program 34 from the TA.

The processor 31 is configured to execute the instructions in the memory. The processor may also comprise its own internal temporary memory, such as cache memory, for temporarily storing data during execution of the instructions in the memory 32.

The storage 33 may comprise of secure storage for storing the server secret 8. The storage may also comprise a client authentication program a copy of which it sends to each new client that wants to authenticate to a server.

In some implementations, the authentication server is implemented as software only and comprises only the program instructions to be executed by the processor. In other implementations, the server may be a dedicated hardware device.

Figure 6:
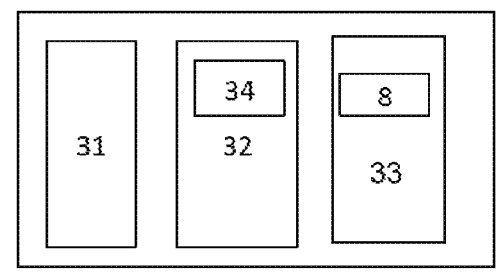
FIG. 6 is a schematic block diagram of an authentication server example.

An example authentication server is shown in FIG. 6.

System Example

In an example system, the client, the server and the TA may be connected by a communication medium, such as a data network. For example, the entities may be connected by the Internet. However, the client, the server and the TA may additionally or alternatively communicate using other communication media. It will be realised that processors, memories and storage of the client, the server and the TA may each comprise one or more processors, memories and storage modules.

The system may use bilinear mappings to allow the client to authenticate itself to the authentication server. The system may use the bilinear mappings to allow the client to authenticate itself to the server without sending its secret information to the authentication server. This is known as zero knowledge proof authentication. A zero knowledge proof cryptography scheme is a scheme in which one party (the prover) proves to the other party (the verifier) that is has a secret value, without revealing anything about the secret. Consequently, no matter how many times the client authenticates to the server, the server will not be able to determine the secret.

The bilinear mappings may comprise pairings. Pairings work on a special pairing-friendly elliptic curve. An asymmetric pairing map may be used. The bilinearity characteristic of pairings may be used to realise the examples of zero knowledge proof cryptography schemes described herein.

Pairings on elliptic curves are known by the skilled person and will not be described in detail herein. Briefly, an asymmetric pairing takes as input two points on the curve, belonging to distinct first and second groups, and maps the points to an element in a third group. Because of the bilinear property of pairings, a client secret sA and data associated with the server can be mapped to the same element in the third group as data associated with the client and a server secret sQ, when the client secret and the server secret are constructed from the data associated with the client and the data associated with the server, respectively, in a specific way.

The client secret may be constructed in the TA by hashing public data associated with the client, in the form of the client identity, to a point A on the curve belonging to first group and then multiplying, on the curve, the point with a master secret s. The server secret is constructed in the TA by multiplying, on the curve, a fixed point Q, in the second group, with the master secret s. Consequently, by calculating a pairing based on its own secret data in the server, and analysing the result of the pairing based on the client secret or a value derived from that pairing, the server can determine whether the client was in possession of the client secret without receiving the client secret itself.

The skilled person will appreciate that there exists a large number of suitable elliptic curves that can be used to carry out the pairings. Moreover, although the pairings are described to be carried out on elliptic curves herein, it will be realised that other suitable curves may be used.

Elliptic curve algebra defines particular rules for carrying out additions and multiplications of points on the curves. These are known in the art and will not be described herein. Briefly, the rules define an operation called addition that involves adding two points A and B together to obtain another point C. Geometrically this may involve, for example for points with different x coordinates, drawing a straight line between the points A and B and finding the point C where the straight line intersects the curve. However the rules will also define how the new point can be obtained algebraically. The operation called multiplication is defined by repeated additions of the same point A a number of k times to obtain kA. The operation called subtraction involves obtaining the negative of the point B to be subtracted from another point A and then carrying out an addition of the points A and −B. The negative of B is the point with the same x coordinate but with the negative of the y coordinate, −B.

A number of different types of pairings can be used to realise the cryptographic protocols described herein, as will be appreciated by the skilled person. For example, the Weil pairing, the Tate pairing, the ate pairing and the R-ate pairing are examples of suitable pairings that may be used.

The protocols may further be constructed such that the client is not required to calculate a pairing and the heavy processing is instead carried out in the authentication server. The client may carry out a calculation, using its secret, and sends the results to the server. The server, using its own secret and by computing a pairing calculation, may check whether the client would have been able to obtain the results received without being in possession of the client secret. If the server determines that the client would not have been able to obtain the results of the calculation without being in possession of the secret, the server authenticates the client. The calculation carried out in the server may include a pairing using the results received from the client and a pairing based on its own secret information and a product of the two pairings. The calculation may be carried out as a multi-pairing calculation. In some examples, if the product equals a certain value, the server can determine that the client is in fact in possession of the key. In some examples, if the server determines that the client is not in possession of the secret it may be able to determine the extent of the error in the PIN received by the client. Its response to the client may depend on the extent of the error in the PIN.

Multi-Factor Authentication Examples

Multi-factor authentication commonly consists of (a) something we have, (b) something we know, and (c) something we are. The form in which it is most familiar to us would be as the two-factor automated teller machine (ATM) bank card and a 4 digit PIN number.

The "something we have" factor can be a physical token storing static data, perhaps in the form factor of data recorded on a magnetic strip, or in a Quick Response (QR) code, or the familiar universal serial bus (USB) stick. Or it can be a smart-card. Note that a smartcard will have extra functionality in that it can have its own protected secrets and computing ability, and cannot be cloned. However a smart card is much more expensive, and losing it requires expensive replacement.

The "something we know" factor is a password. However passwords come in two distinct flavours. The high-entropy password that is now more commonly demanded of us, for example the password which must have eight or more characters and involve both upper and lower case letters, and at least one numeral. Then there is the low entropy password, for example the 4-digit PIN.

The "something we are" factor is captured as a biometric, perhaps a fingerprint or an iris scan. However they are commonly inexact, and a certain range of values for a biometric measurement might be regarded as acceptable.

References 1 to 6 are incorporated by reference.

REFERENCES

1. P. S. L. M. Barreto and M. Naehrig. Pairing-friendly elliptic curves of prime order. In Selected Areas in Cryptology—SAC 2005, volume 3897 of Lecture Notes in Computer Science, pages 319-331. Springer-Verlag, 2006.
2. M. Bellare, C. Namprempre, and G. Neven. Security proofs for identity-based identification and signature schemes. In Eurocrypt 2004, volume 3027 of Lecture Notes in Computer Science, pages 268-286. Springer-Verlag, 2004.
3. S. Galbraith, K. Paterson, and N. Smart. Pairings for cryptographers. Discrete Applied Mathematics, 156: 3113-3121, 2008.
4. J. Pollard. Monte Carlo methods for index computation mod p. Mathematics of Computation, 32, 1978.
5. M. Scott. Authenticated ID-based key exchange and remote log-in with simple token and PIN number. Cryptology ePrint Archive, Report 2002/164, 2002. http://eprint.iacr.org/2002/164.
6. G. Simmons. The subliminal channel and digital signatures. In Eurocrypt 1984, pages 364-378. Springer-Verlag, 1985.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of authenticating a client computing device to a server, the method including the steps of:
   (i) the authentication approach using a pairing based cryptographic approach, using type-3 pairing defined by a mapping e: $G1 \times G2 \rightarrow GT$, in which G1, G2 and GT are all cyclic groups of the same prime order q and in which the groups G1 and G2 are distinct, and in which Q is a fixed point in G2, the client computing device receiving an encrypted identifier $(s-\epsilon)A$ from a trusted authority, the trusted authority having used its master key s and a secret $\epsilon$ to encrypt the encrypted identifier $(s-\epsilon)A$ associated with the client computing device, where $A=H1(ID)$, where H1 is a hash function which hashes its input to a point on G1, and ID is an identifier of the client computing device;
   (ii) the server receiving from the trusted authority a secret sQ encrypted by the trusted authority using the master key s;
   (iii) the client computing device generating a random $x<q$, and calculating $A=H1(ID)$ and $U=xA$;
   (iv) the client computing device calculating $y=H(U|T)$, where H is a hash function which hashes its input to an element in Fq, and T is a time stamp;
   (v) the client computing device calculating $V=-(x+y)(s-\epsilon)A$;
   (vi) the client computing device sending ID, U, T and V to the server in an authentication request;
   (vii) the server rejecting the authentication request if T is not current, the server otherwise proceeding to step (viii);
   (viii) the server calculating $A=H1(ID)$ and $y=H(U|T)$;
   (ix) the server calculating $g=e(V,Q) \cdot e(U+yA, sQ) = e(U,Q)^{\wedge}(\epsilon)$, and solving for $\epsilon$;
   (x) the server recording that the client computing device with the identifier ID has supplied the secret $\epsilon$ in an encrypted form, and
   (xi) the server authenticating the client computer.

2. Method of claim 1, the method including the step of: the trusted authority using its master key s and the secret $\epsilon$ to encrypt the encrypted identifier (s-$\epsilon$)A, and sending the encrypted identifier (s-$\epsilon$)A to the client computing device.

3. Method of claim 1, the method including the step of: the trusted authority using its master key s to calculate the secret sQ, and sending sQ to the server.

4. Method of claim 1, wherein the secret $\epsilon$ is a short secret.

5. Method of claim 4, wherein the short secret $\epsilon$ is a credit card number.

6. Method of claim 1, wherein the method is one in which a financial transaction is authenticated.

7. Method of claim 1, in which the server decrypts the secret $\epsilon$ without the server knowing (s-$\epsilon$)A.

8. Method of claim 1, in which the server decrypts the secret $\epsilon$ without the client computing device knowing the secret $\epsilon$.

9. Method of claim 1, in which the client computing device has no way of decrypting (s-$\epsilon$)A to obtain the secret $\epsilon$.

10. Method of claim 1, in which the pairing-based cryptographic approach uses an elliptic curve.

11. Method of claim 10, in which the elliptic curve is a Barreto-Naehrig (BN) elliptic curve.

12. Method of claim 10, in which the elliptic curve uses Advanced Encryption Standard (AES)-128 level of security, or in which the elliptic curve uses Advanced Encryption Standard (AES)-192 level of security, or in which the elliptic curve uses Advanced Encryption Standard (AES)-256 level of security.

13. Method of claim 1, in which the pairing-based cryptographic approach makes standard pairing-based security assumptions, including external Diffie-Hellman (XDH) assumption that decisional Diffie-Hellman problem is hard in G1.

14. Method of claim 1, in which the server is authenticated to the client computing device.

15. Method of claim 1, in which the method attempts to prove in zero knowledge to the server that an owner of the claimed identity ID is in possession of the value (s-$\epsilon$)A issued to it by the trusted authority.

16. Method of claim 1, in which the server performs a calculation of a pairing and a solution of a discrete logarithm problem in GT, to find $\epsilon$.

17. Method of claim 16, in which the server performs a calculation of a pairing and a solution of a discrete logarithm problem in GT, using method of Pollard's Kangaroos, to find E.

18. Method of claim 1, in which the client computing device receives the encrypted identifier (s-$\epsilon$)A from the trusted authority in a plurality of blocks.

19. Method of claim 1, in which the encrypted identifier (s-$\epsilon$)A includes an authentication factor.

20. Method of claim 19, the method including the step of receiving an authentication factor from a user.

21. Method of claim 20, the method including the step of the authentication factor being re-inserted in the encrypted identifier (s-$\epsilon$)A.

22. Method of claim 20, in which if the authentication factor is incorrect, a valid secret $\epsilon$ will not be decrypted by the server.

23. Method of claim 1, in which the trusted authority is distributed.

24. Method of claim 1, in which the client computing device is a mobile phone.

25. Method of claim 1, in which the ID which is an identifier of the client computing device is a pseudonym in a predetermined format to preserve anonymity.

26. A system comprising a client computing device and a server, the system configured to perform an authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, in which:
   (i) the client computing device is arranged to receive an encrypted identifier (s-$\epsilon$)A from a trusted authority, the trusted authority having used its master key s and a secret $\epsilon$ to encrypt the encrypted identifier (s-$\epsilon$)A associated with the client computing device, where A=H1(ID), where H1 is a hash function which hashes its input to a point on G1, and ID is an identifier of the client computing device;
   (ii) the server is arranged to receive from the trusted authority a secret sQ encrypted by the trusted authority using the master key s;
   (iii) the client computing device is configured to generate a random x<q, and to calculate A=H1(ID) and U=xA;
   (iv) the client computing device is configured to calculate y=H(U|T), where H is a hash function which hashes its input to an element in Fq, and T is a time stamp;
   (v) the client computing device is configured to calculate V=−(x+y)(s-$\epsilon$)A;
   (vi) the client computing device is configured to send ID, U, T and V to the server in an authentication request;
   (vii) the server is configured to reject the authentication request if T is not current, the server configured to otherwise proceed to (viii);
   (viii) the server is configured to calculate A=H1(ID) and y=H(U|T);
   (ix) the server is configured to calculate g=e(V,Q)·e(U+yA,sQ)=e(U,Q)^($\epsilon$), and to solve for $\epsilon$;
   (x) the server is configured to record that the client computing device with the identifier ID has supplied the secret $\epsilon$ in an encrypted form, and
   (xi) the server is configured to authenticate the client computer.

27. A server forming part of a system comprising a client computing device and the server, the system configured to perform an authentication approach using a pairing based cryptographic approach, using type-3 pairing defined by a mapping e: G1×G2→GT, in which G1, G2 and GT are all cyclic groups of the same prime order q and in which the groups G1 and G2 are distinct, and in which Q is a fixed point in G2, in which:
   (i) the client computing device is arranged to receive an encrypted identifier (s-$\epsilon$)A from a trusted authority, the trusted authority having used its master key s and a secret $\epsilon$ to encrypt the encrypted identifier (s-$\epsilon$)A associated with the client computing device, where A=H1(ID), where H1 is a hash function which hashes its input to a point on G1, and ID is an identifier of the client computing device;
   (ii) the server is arranged to receive from the trusted authority a secret sQ encrypted by the trusted authority using the master key s;
   (iii) the client computing device is configured to generate a random x<q, and to calculate A=H1(ID) and U=xA;
   (iv) the client computing device is configured to calculate y=H(U|T), where H is a hash function which hashes its input to an element in Fq, and T is a time stamp;

(v) the client computing device is configured to calculate $V=-(x+y)(s-\epsilon)A$;

(vi) the client computing device is configured to send ID, U, T and V to the server in an authentication request;

(vii) the server is configured to reject the authentication request if T is not current, the server configured to otherwise proceed to (viii);

(viii) the server is configured to calculate $A=H1(ID)$ and $y=H(U|T)$;

(ix) the server is configured to calculate $g=e(V,Q)\cdot e(U+yA,sQ)=e(U,Q)^{\wedge}(\epsilon)$, and to solve for $\epsilon$;

(x) the server is configured to record that the client computing device with the identifier ID has supplied the secret $\epsilon$ in an encrypted form, and (xi) the server is configured to authenticate the client computer.

28. A pair of computer program products, including a client computing device computer program product and a server computer program product, the client computing device computer program product executable on a client computer device, and the server computer program product executable on a server, to perform a method of authenticating the client computing device to the server, the authentication approach using a pairing based cryptographic approach, using type-3 pairing defined by a mapping e: $G1 \times G2 \rightarrow GT$, in which G1, G2 and GT are all cyclic groups of the same prime order q and in which the groups G1 and G2 are distinct, and in which Q is a fixed point in G2, the method including:

(i) the client computing device receiving an encrypted identifier $(s-\epsilon)A$ from a trusted authority, the trusted authority having used its master key s and a secret $\epsilon$ to encrypt the encrypted identifier $(s-\epsilon)A$ associated with the client computing device, where $A=H1(ID)$, where H1 is a hash function which hashes its input to a point on G1, and ID is an identifier of the client computing device;

(ii) the server receiving from the trusted authority a secret sQ encrypted by the trusted authority using the master key s;

(iii) the client computing device generating a random $x<q$, and calculating $A=H1(ID)$ and $U=xA$;

(iv) the client computing device calculating $y=H(U|T)$, where H is a hash function which hashes its input to an element in Fq, and T is a time stamp;

(v) the client computing device calculating $V=-(x+y)(s-\epsilon)A$;

(vi) the client computing device sending ID, U, T and V to the server in an authentication request;

(vii) the server rejecting the authentication request if T is not current, the server otherwise proceeding to (viii);

(viii) the server calculating $A=H1(ID)$ and $y=H(U|T)$;

(ix) the server calculating $g=e(V,Q)\cdot e(U+yA,sQ)=e(U,Q)^{\wedge}(\epsilon)$, and solving for $\epsilon$;

(x) the server recording that the client computing device with the identifier ID has supplied the secret $\epsilon$ in an encrypted form, and (xi) the server authenticating the client computer.

* * * * *